United States Patent [19]

Hudgins, Jr.

[11] Patent Number: 4,615,001
[45] Date of Patent: Sep. 30, 1986

[54] QUEUING ARRANGEMENT FOR INITIATING EXECUTION OF MULTISTAGE TRANSACTIONS

[75] Inventor: Walter R. Hudgins, Jr., Elburn, Ill.

[73] Assignee: AT&T Bell Laboratories, Murray Hill, N.J.

[21] Appl. No.: 594,852

[22] Filed: Mar. 29, 1984

[51] Int. Cl.[4] .......................... G06F 1/00; G06F 9/46
[52] U.S. Cl. .................................................. 364/200
[58] Field of Search ... 364/200 MS File, 900 MS File

[56] References Cited

U.S. PATENT DOCUMENTS

| 4,320,455 | 3/1982 | Woods et al. | 364/200 |
|---|---|---|---|
| 4,375,083 | 2/1983 | Maxemchuk | 364/900 |
| 4,412,285 | 10/1983 | Neches et al. | 364/200 |
| 4,445,177 | 4/1984 | Bratt et al. | 364/200 |
| 4,482,956 | 11/1984 | Tallman | 364/200 |
| 4,543,627 | 9/1985 | Schwab | 364/200 |

OTHER PUBLICATIONS

J. L. Johnstone, "RTOS-Extending OS/360 for Real Time Spaceflight Control," *Proceedings of the Spring Joint Computer Conference*, May 14–16, 1969, (Montvale, US), pp. 15–27.

E. C. Coffman et al., "Feedback Queueing Models for Time-Shared Systems", *Journal of the Association for Computing Machinery*, vol. 15, No. 4, Oct. 1968, (New York, US), pp. 549–576.

E. E. Horowitz and S. Sahni: "Fundamentals of Data Structures" (Woodland Hills, CA, Computer Science Press, 1976), pp. 77–100.

M. V. Wilkes, *Time Sharing Computer Systems*, 2nd Ed., 1972, (London, GB), pp. 77–78.

M. Freeman, et al., "Perseus: An Operating System Machine," *Third USA–Japan Computer Conference*, Oct. 10–12, 1978, (Baltimore, US), pp. 430–435.

D. Phillips, "MP Manages Virtual Memory for Handling Large Programs," *Electronic Design*, vol. 31, Oct. 1983, No. 22, pp. 199–205.

*Primary Examiner*—James D. Thomas
*Assistant Examiner*—William G. Niessen
*Attorney, Agent, or Firm*—Werner Ulrich

[57] ABSTRACT

In a data processing or control system, a method and apparatus for scheduling the sequential processing of actions requested by a series of transaction requests where the execution of two or more sequential processing actions is required to honor each request. A single queue is used to store entries corresponding to the transaction requests. A particular entry is not removed from the queue until all the associated processing actions have been completed. An exemplary queue is used for scheduling the processing actions of a series of transaction request entries, each entry requiring the performance of initial processing and final processing. The queue is controlled by three queue indicators such as pointers. A load pointer indicates the location in the queue where the most recent transaction request entry was loaded, an intermediate pointer indicates the location of the transaction request entry for which initial processing was most recently performed, and an unload pointer indicates the location of the transaction request entry for which final processing was most recently performed.

11 Claims, 10 Drawing Figures

FIG. 9 NOTIFY PROCESS (FINAL PROCESSING)

QUEUING ARRANGEMENT FOR INITIATING EXECUTION OF MULTISTAGE TRANSACTIONS

TECHNICAL FIELD

This invention relates to data processing and control systems and, more specifically, to queuing arrangements for ordered execution of transactions within such systems.

BACKGROUND OF THE INVENTION

In modern data processing and control systems, the data processing operations are carried out by one or more data processors, each consisting of a central processing unit and memory. The central processing unit, under the control of a program, stored in memory, processes data, also stored in memory. Data is entered into and taken out of memory via input/output units such as the reservation terminals of an airline reservation system.

Data processing and control systems frequently carry out many tasks or program processes concurrently. Each of these tasks is accomplished by carrying out one or more individual transactions. Queues are commonly used to schedule the carrying out or execution of such transactions. The program processes which generate the requests for executing transactions load transaction request entries into a first-in first-out (FIFO) queue in the memory of the system. The system then executes the transactions by processing the transaction request entries in the order in which the entries were loaded in the FIFO queue.

In some applications, portions of a transaction cannot be executed readily as one long action. For example, different bulk storage units may be associated with an initial processing action and a final processing action of a single transaction. The second bulk storage unit is unlikely to be available immediately after the first storage unit has completed an action. Accordingly, the processor would have to wait for the second bulk storage unit to become available if the initial and final processing actions were included in the same processing action. Such waiting by the processor wastes system resources since the processor is unavailable to process other actions while waiting. Prior systems have included two queues in order to utilize the processor more fully. A first queue stores transaction request entries for performance of initial processing actions and a second queue stores transaction request entries for performance of final processing actions. When the initial processing action is completed, the transaction request entry is moved from the first queue to the second queue. In terms of the prior example relating to first and second bulk storage units, the first queue is served only when the first bulk storage unit is available, and the second queue is served only when the second bulk storage unit is available.

The use of two or more queues in sequence requires additional data processing operations to be performed to move transaction request entries from one queue to another. Performing such unproductive overhead operations reduces the total data processing capacity of a system. Further, each sequential queue must be made large enough to respond to peak demands for that queue; this requires that substantial expensive memory resources must be dedicated to the queues.

In view of the foregoing, a recognized problem in the art is that no efficient method exists for scheduling the ordered performance of a sequence of actions for each of a number of transaction requests where the sequence of actions cannot be efficiently executed as one longer action.

SUMMARY OF THE INVENTION

In accordance with the present invention, transaction request entries are loaded sequentially into a single queue for both initial and final processing. Initial processing actions are performed for each transaction request entry. The transaction request entry is retained in the queue after initial processing is completed and at least until final processing is initiated. Final processing of transaction request entries is performed in the order in which these entries were loaded and is in each case performed after the corresponding initial processing action has been performed. Advantageously, transaction request entries need not be moved between queues to prepare for final processing. Further, the length of the single queue can be chosen to respond to peaks of the total transaction rate and delays; this length will generally be less than the sum of the lengths of separate initial processing and final processing queues, separately chosen to respond to initial and final processing delay peaks.

In accordance with one aspect of the invention, three control indicators are associated with the queue. A load indicator contains information for deriving the location in the queue where the next transaction request entry is to be loaded. An intermediate indicator contains information for deriving the location in the queue where the transaction request entry for which initial processing is next to be performed is stored. An unload indicator contains information for deriving the location in the queue where the transaction request entry for which final processing is next to be performed is stored. If one or more intermediate stages of processing are required for processing a transaction, additional intermediate indicators are used, one such additional intermediate indicator for each intermediate stage. Each such additional intermediate indicator contains information for deriving the location in the queue of the next transaction request entry for which that stage of intermediate processing is to be performed. Advantageously, transaction request entries need not be moved through a sequence of sequential queues. Further, the size of the single queue will generally be substantially less than the sum of the sizes of a group of sequential queues, one for each stage.

BRIEF DESCRIPTION OF THE DRAWING

A more complete understanding of the present invention may be obtained from a consideration of the following description when read in conjunction with the drawing in which.

DETAILED DESCRIPTION

Figure 1:
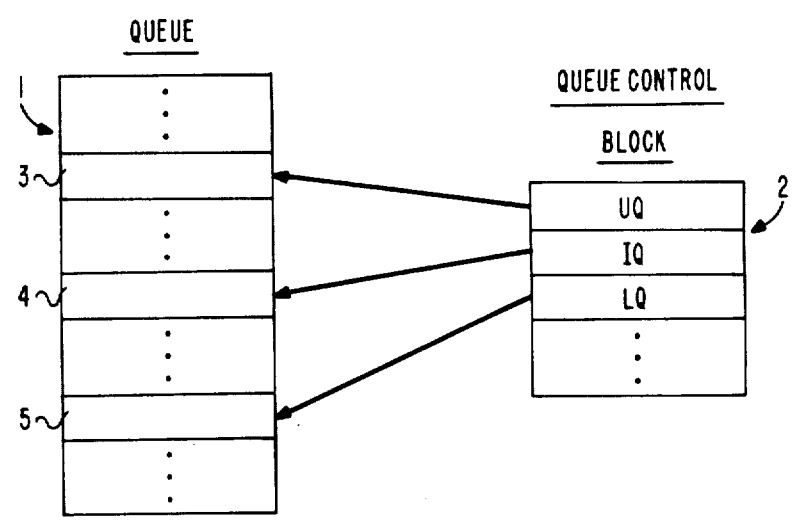
FIG. 1 is a memory layout of a queue for storing transaction request entries and of the control block comprising three control indicators associated with the queue.

FIG. 1 shows a queue 1 and an associated control block 2 illustrative of the present invention. Queue 1 contains a number of locations, such as locations 3, 4 and 5, for storing transaction request entries. In the example which follows, each of these entries is associated with a particular transaction request and each of the transaction requests requires that initial and final processing actions be performed. The queue control block 2 contains three memory indicators, UQ, IQ and LQ. In this illustrative example, each of the memory indicators UQ, IQ and LQ are pointers, each pointer comprising a memory address of one of the transaction request entries in the queue. The load queue pointer LQ contains the address of location 5, the location of the transaction request entry in the queue which was most recently loaded. The intermediate queue pointer IQ contains the address of location 4, the location of the transaction request entry for which initial processing was most recently performed. The unload queue pointer UQ contains the address of location 3, the location of the transaction request entry for which final processing was most recently performed.

In the multiprocessing system of this example, transaction requests are generated by a number of different program processes collectively called requesting processes. The queue is controlled by a program process called the queue control process. The pointers LQ, IQ and UQ are advanced with every transaction request entry loaded, initially processed and finally processed, respectively. Therefore, after all previously loaded transaction request entries have been initially processed, the intermediate pointer IQ, when advanced, will point to the transaction request entry loaded in the loading step, and initial processing for that transaction request entry will be performed. Similarly, after all previously loaded transaction requests have been finally processed, the unload pointer UQ, when advanced, will point to the transaction request entry loaded in the loading step, and final processing for that transaction request entry will be performed.

Figure 2:
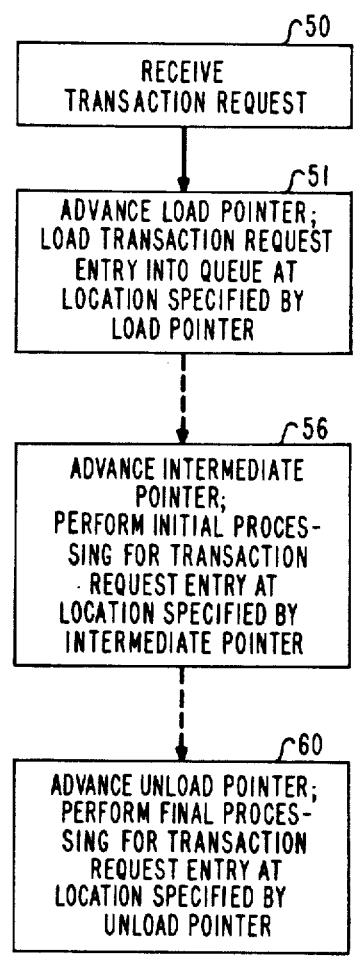
FIG. 2 is a basic flow diagram of the processing of one transaction request.

FIG. 2 traces one specific transaction request entry from the time the entry is loaded into the queue until final processing is competed. When a transaction request is received (action box 50) by the queue control process from a requesting process, the load pointer LQ is advanced to point to the next location in the queue and the transaction request entry is loaded (action box 51) in queue 1 at the location, such as location 5, now pointed to by load pointer LQ. Nothing further is done with the transaction request entry at this time and the system executes other program processes.

The dashed line following action box 51 indicates a lapse of time while other program processes are being executed. During this time, other transaction request entries may be loaded, and initial and final processing actions for other transaction request entries may be performed. Eventually, the intermediate pointer IQ is advanced to point to the specific transaction request entry previously loaded in location 5 and initial processing is performed for that transaction request entry (action box 56).

The dashed line following action box 56 indicates a lapse of time while other program processes are being executed. During this time, other transaction request entries may be loaded, and initial and final processing actions for other transaction request entries may be performed. Eventually, the unload pointer UQ is advanced to point to the specific transaction request entry in location 5, and final processing is performed for the specific transaction request entry stored at location 5 now pointed to by the advanced unload pointer (action box 60). Thus, initial and final processing for the transaction request entry loaded in location 5 will have been performed in the correct sequence, initial processing following initial processing for previously loaded transaction request entries, and final processing following initial processing of that entry and final processing of previously loaded entries.

Figure 3:
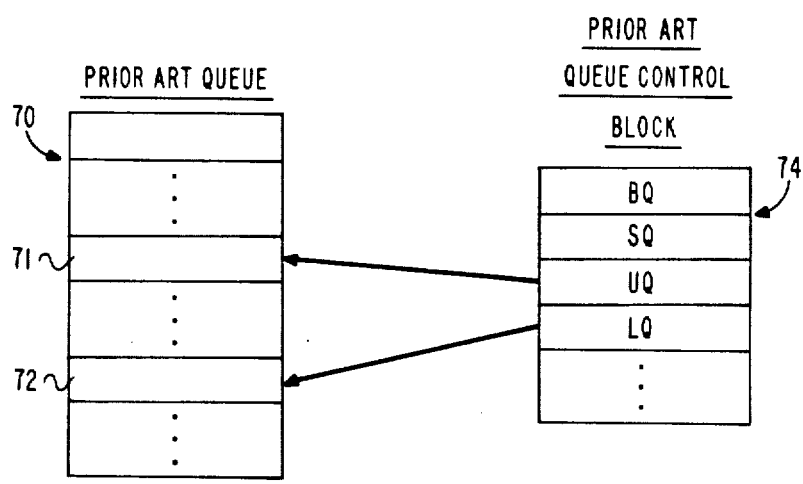
FIG. 3 is a memory layout of a prior art queue with two associated control indicators.

Before describing the operation of the present embodiment in further detail, it is useful to illustrate a prior art circular queue and its control pointers. FIG. 3 is a memory layout of a prior art circular queue, and its control structure, described, for example, in Horwitz and Sahni: *Fundamentals of Data Structures*, Computer Science Press, 1976, pp. 84–86. The queue stores transaction request entries. FIG. 3 includes prior art queue 70 and associated queue control block 74 which stores information used to control queue 70. Prior Art queue control block 74 includes a begin address BQ which indicates the location in memory of the beginning of the queue, the size of the queue SQ which specifies the length of the queue, a load pointer LQ which indicates the location in memory where the most recently loaded transaction request entry is stored, and an unload pointer UQ which indicates the location in memory where the transaction request entry for which processing was most recently performed is stored. Queue 70 is stored in locations of memory whose addresses are numerically consecutive. The size of the queue SQ represents the number of such consecutive locations occupied by queue 70. The queue occupies all locations from begin address BQ through address $BQ+SQ-1$. Every time a new request is loaded in the queue, the load pointer LQ is advanced and the transaction request entry is stored at the location indicated by the advanced value of the load pointer LQ. Every time a transaction request entry is to be processed, the unload pointer UQ is advanced and the transaction request entry indicated by the advanced unload pointer UQ is processed.

The queue is originally empty and the load pointer LQ and unload pointer UQ may, for example, both point to the beginning (numerically smallest address BQ) of the queue. As transaction request entries are loaded into the queue, the load pointer LQ is advanced by being incremented, and as transaction request entries are processed, the unload pointer UQ is advanced by being incremented. Each such increment is by the number of consecutive memory locations occupied by one transaction request entry. Eventually, the load pointer LQ points to the last memory location in which a transaction request entry may be loaded in the queue. Thereafter, if the load pointer LQ were to be incremented, it would indicate a location outside the boundaries of the queue, a location where transaction request entries may not be stored. Accordingly, when the load pointer LQ points to the last memory location for storage of a transaction request entry in the queue, the load pointer LQ is advanced by being set to the value of the location of the beginning of the queue, stored in the queue control block 74 as begin address BQ. Thereafter, new transaction request entries may be loaded, overwriting the transaction request entries previously loaded and previously processed. The unload pointer UQ is similarly set to the value of the location of the beginning of the queue BQ whenever the unload pointer UQ is advanced from indicating the last location for storage of an entry in the queue. This type of queue is referred to as circular since the beginning of the queue, in effect, follows the end.

Figure 4:
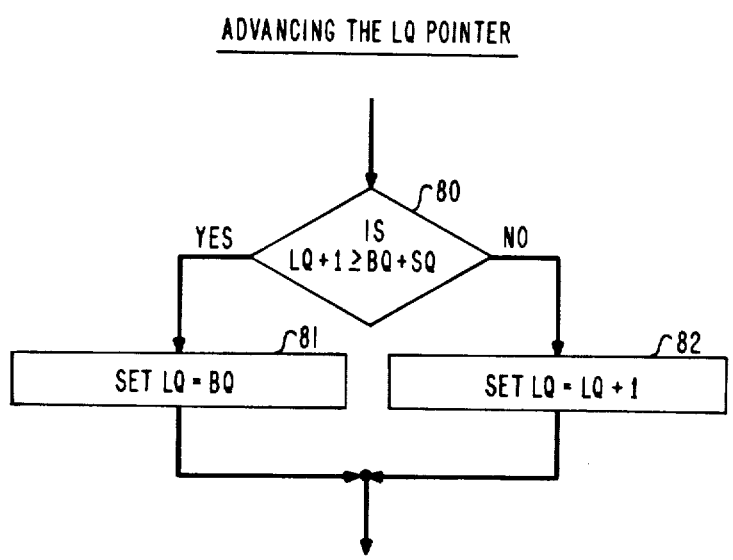
FIG. 4 is a flow diagram of the steps for advancing a control indicator for a queue.

The process for advancing a pointer for a circular queue is illustrated in FIG. 4, which shows how a typical pointer, in this case the load pointer LQ, is advanced. The example illustrates the case of a transaction request entry which occupies only one memory location, but can easily be extended to a longer transaction request by substituting the length of one entry for 1. Test 80 checks whether the load pointer LQ, if incremented by one, would be equal to or greater than the location just beyond the queue, i.e., the value of the begin address BQ plus the size of the queue SQ. When $LQ+1 \geq BQ+SQ$ (positive result of test 80), the load pointer LQ is set to the value of begin address BQ (action box 81). Otherwise, when $LQ+1 < BQ+SQ$ (negative result of test 80), the load pointer LQ is set to $LQ+1$ (action box 82), i.e., LQ is incremented by one. In the present description, the advanced value of pointer P is represented by P(A). For example, LQ(A) represents the advanced value of LQ. In the language of the present description the process illustrated in FIG. 4 represents: Set LQ=LQ(A).

When no unprocessed transaction request entries are in the queue, the load pointer LQ and unload pointer UQ are equal. This state also occurs when the entire queue is loaded with unprocessed entries. In order to differentiate between these two states, the queue is never allowed to be completely full of unprocessed entries. If a transaction request entry is about to be loaded into the last available space in the queue, i.e., if LQ(A) would equal the value of UQ, the entry is not stored in the queue and the requesting process is notified that the request cannot be accepted. With this arrangement it is possible to store a new transaction request entry whenever LQ(A) does not equal the value of the unload pointer UQ. The arrangement also makes it possible to recognize that an unprocessed transaction request entry is stored in the queue whenever the load pointer LQ (representing the address of the entry most recently loaded) and the unload pointer UQ (representing the address of the entry most recently processed) are not equal.

Whenever the unload pointer UQ is advanced, the memory location pointed to by the previous value of UQ is available for the loading of a new transaction request entry. The transaction request entry currently stored in that location is thereby effectively removed from the queue since it may now be freely overwritten by the loading of a new transaction request entry. Prior to the advance of the unload pointer UQ, a transaction request entry is retained in the queue.

Figure 5:
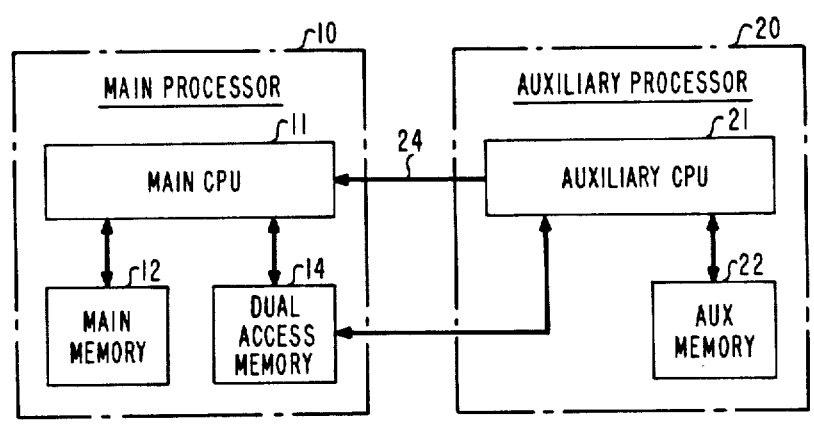
FIG. 5 is a block diagram of a main processor in which such a queue is stored, and an auxiliary processor.

FIG. 5 shows an arrangement for using the present invention, which arrangement includes a main processor 10 and an auxiliary processor 20. Main processor 10 includes a main central processing unit 11, main memory 12, and dual access memory 14. Auxiliary processor 20 includes an auxiliary central processing unit 21 and auxiliary memory 22. Dual access memory 14, is of a type well known in the art and is accessible by main central processing unit 11 and by auxiliary central processing unit 21. Auxiliary processor 20 is also connected to main central processing unit 11 of main processor 10 by a communication path 24 which path can be used to transmit a signal to interrupt the execution of programs by main processor 10.

The main processor 10 operates in a multiprocessing mode in which individual program processes communicate by sending and receiving data messages. Included in the processes executing in the main processor 10 are a message queue control process and a group of transaction requesting processes (requesting processes). The requesting processes generate messages containing command data and requesting the execution of a maintenance command, and send these messages to the message queue control process. The maintenance commands in this embodiment of the invention include commands to switch a unit out of service, to disable an error detection circuit, or to activate a standby unit. Although the requesting program processes and message queue control process are executed in main processor 10 of the system, the maintenance commands are executed in auxiliary processor 20. A message requesting the execution of a maintenance command is treated as a transaction request, and causes the message queue control process to load a transaction request entry, in this case, a pointer to the transaction request message, into a message queue. This message queue and the operation of the message queue control process illustrate the principles of the present invention.

Figure 6:
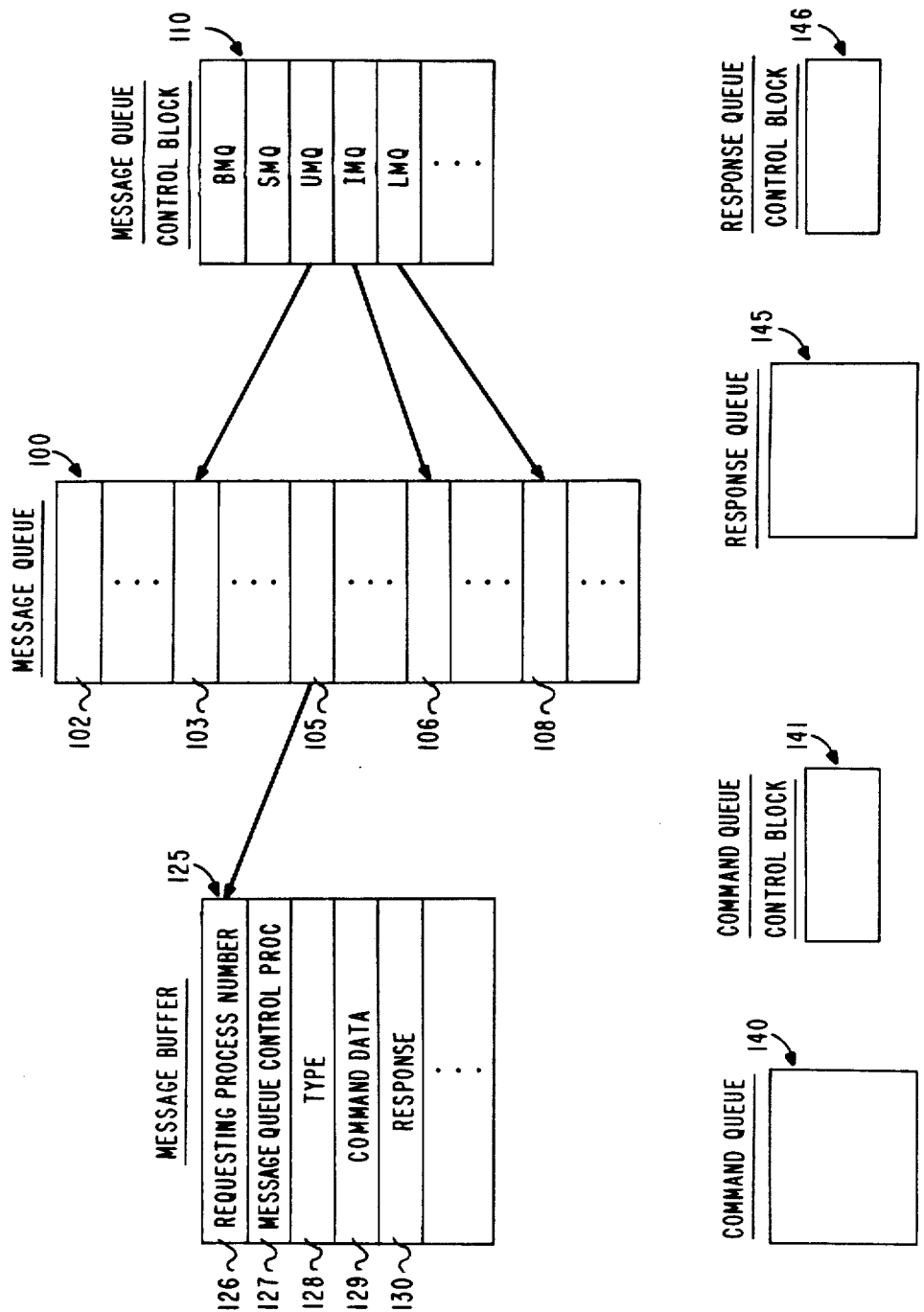
FIG. 6 is a memory layout of a message queue and its associated control indicators, of a message buffer for storing a data message, of a command queue and control block, and a response queue and control block, for communicating between the main processor and the auxiliary processor.

The memory layouts and flow diagrams of the exemplary embodiment of the present invention will now be described in detail. FIG. 6 shows a message queue 100 for storing transaction request entries, an associated message queue control block 110, and a message buffer 125 for storing a typical transaction request message. The message queue control block 110 includes load, intermediate, and unload message queue pointers LMQ, IMQ, and UMQ, the begin message queue address BMQ and the size of the message queue SMQ. For ease of understanding, LMQ, IMQ and UMQ will henceforth be referred to as the load, intermediate and unload pointers. The begin message queue address BMQ and size of the message queue SMQ are used as described with reference to the circular queue of FIG. 3 and 4 for advancing LMQ, IMQ and UMQ.

A transaction request entry, such as that stored in location 105 of message queue 100, is a pointer to a message buffer such as 125. Message buffer 125 contains a message generated by a requesting process. The message includes the process number of the requesting process 126, the process number of the message queue control process 127, the type of message 128, command data 129 from which the message queue control process generates the command to be executed by the auxiliary processor 20 (FIG. 5), and space for a response 130 to the requesting process.

Also shown in FIG. 6 is a command queue 140 with its associated control block 141, and a response queue 145 with its associated control block 146. Both of these queues are located in dual access memory 14 (FIG. 5). The message queue control process performs initial processing by loading a command into command queue 140. Auxiliary processor 20 (FIG. 5) then executes this command and generates a response, such as "success," "failure, type A," or "failure, type B," which it loads into response queue 145. The message queue control process performs final processing by unloading a response from the response queue 145 and loading the response into a memory location, such as location 130 in message buffer 125, to be sent as part of a response message back to the requesting process. Command queue 140 with its control block 141 and response queue 145 with its control block 146 are conventional prior art queues and associated control blocks of the type illustrated in FIG. 3. Control of these queues, including loading, testing for available space and testing for the presence of an entry, is also conventional as described with reference to FIG. 3 and 4.

Each processor in the present embodiment has an associated master control program called an operating system. Operating systems are well known in the art. One example of an operating system which can be used in this type of system is the DMERT operating system described in J. R. Kane, et. al.: "Overview, Architecture and Performance of DMERT", *The Bell System Technical Journal*, (BSTJ), V. 62 No 1 Part 2 January 1983 pp. 291–301, and M. E. Grzelakowski, et. al.: "DMERT Operating System", BSTJ, V. 62, No. 1, Part 2, January 1983, pp. 303–322. The operating system of the main processor 10 (FIG. 5) schedules work, such as the execution of program processes, and conveys messages between program processes.

Figure 7:
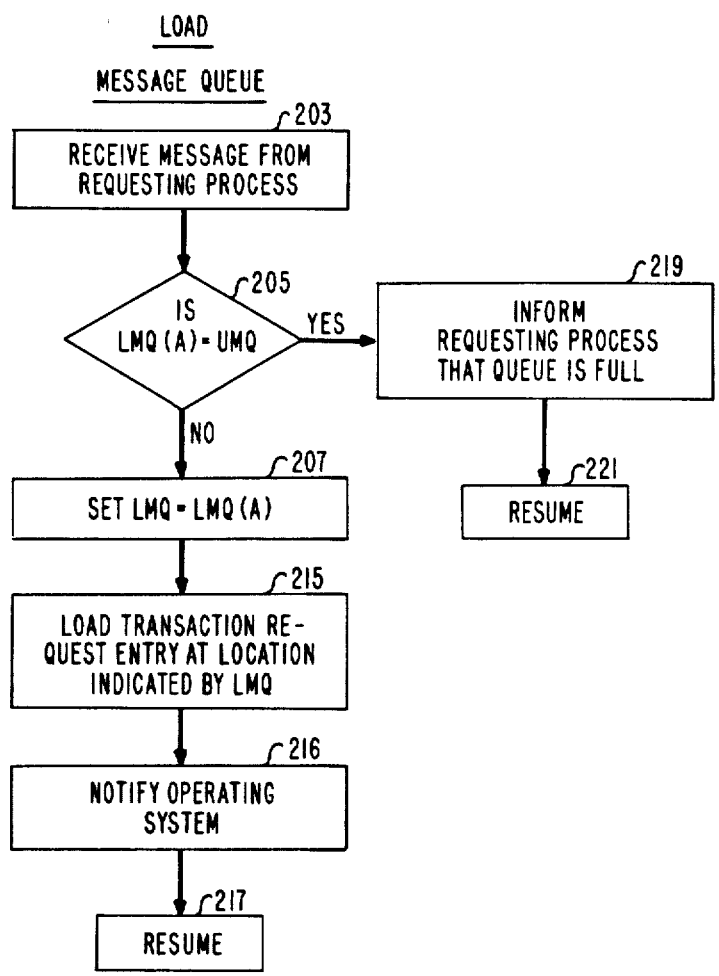
FIG. 7 is a flow diagram of the procedure for loading a transaction request entry into the message queue.

FIG. 7 is a flow diagram of the procedure for loading a transaction request into message queue 100. The message queue control process receives a message from the requesting process (action box 203). This message, which is stored in a message buffer such as message buffer 125, has been conveyed from a requesting process to the message queue control process by the operating system. The transaction request entries are loaded in a predetermined sequence. On such sequence, used in the present embodiment, is the sequence of consecutive entries in a circular queue of the type described with reference to FIG. 3 and 4. Before loading a transaction request entry into the message queue, the message queue control process checks (test 205) whether the message queue is full. If there is room in the queue for another transaction request entry (i.e., LMQ(A)-≠UMQ, negative result of test 205), the message queue load pointer LMQ is advanced, i.e., is set to the value of LMQ(A) (action box 207). The transaction request entry is loaded (action box 215) by loading a pointer to the message buffer in the location within the message queue indicated by the load pointer LMQ. The operating system is notified that a transaction request entry has been loaded (action box 216) so that it can schedule for subsequent execution the initial processing procedure of the message queue control process. The procedure for sending a command to the auxiliary processor is described below with reference to FIG. 8.

When the operating system has been notified of the loading of a transaction request entry, other work is resumed (action box 217) by returning control back to the operating system to initiate execution of the next scheduled task. In the present description, the terms "resume" and "resume other work" refer to the initiation of execution of the next scheduled task by the operating system.

If test 205 finds that the load message queue pointer when advanced, LMQ(A), equals the message queue unload pointer, UMQ, (positive result of test 205) then the queue is full and no more transaction request entries can be loaded in the queue. When the queue is found to be full, the message queue control program generates a response message, signifying that the queue is full, to be sent to the requesting process (action box 219). This is accomplished in the following manner. The message queue control program writes a "queue full" indication in the response location 130 of the transaction request message stored in block 125 (FIG. 6). The message queue control process then addresses the response message to the process that generated the message by interchanging the source and destination process fields, i.e., the requesting process number stored in location 126 and the command queue control process number stored in location 127. The message queue control process then requests the operating system to send the message to the new destination, i.e., the requesting process. Other work is then resumed (action box 221).

Figure 8:
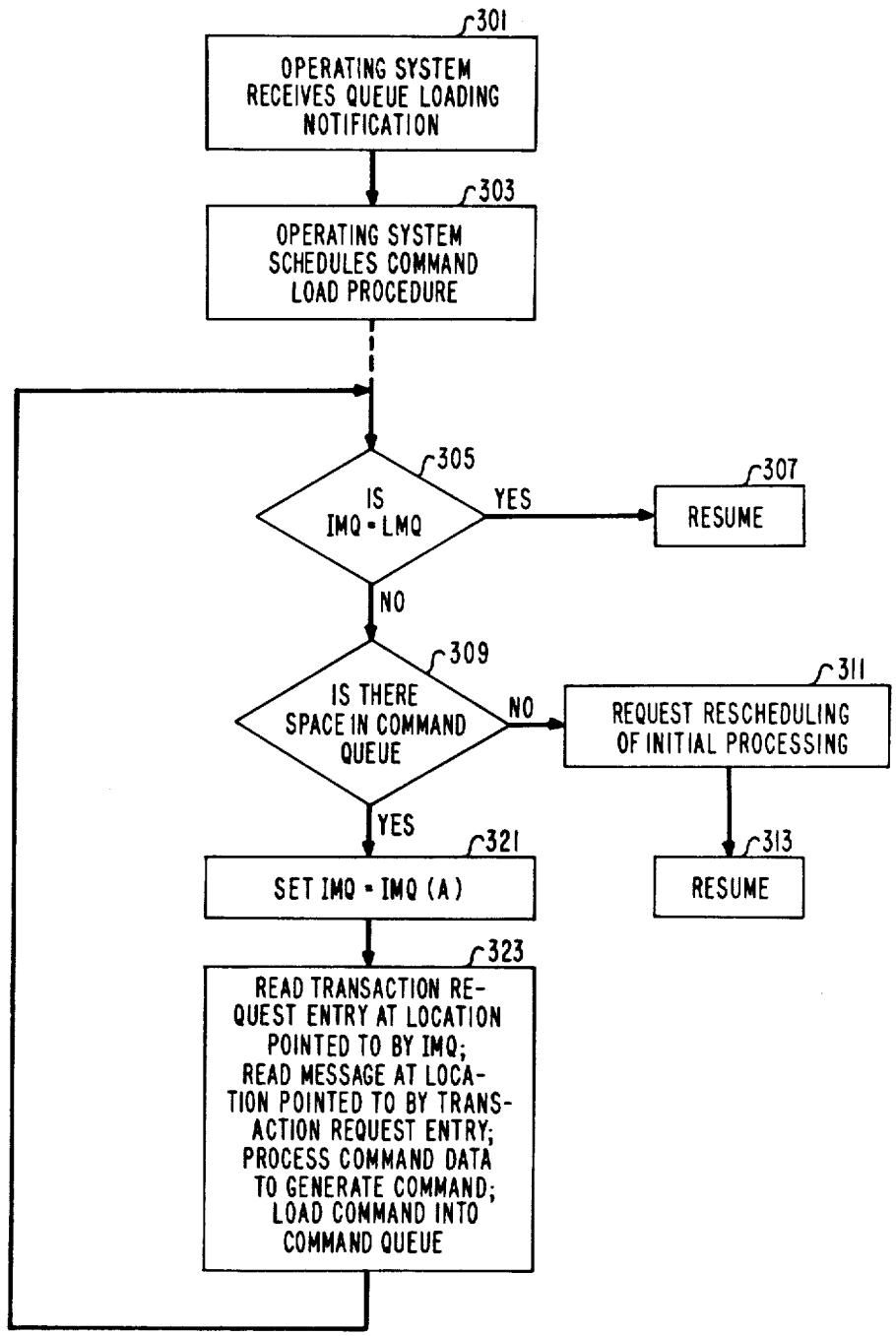
FIG. 8 is a flow diagram of the procedure for sending a command to the auxiliary processor, the initial processing action of a transaction request entry.

FIG. 8 shows the steps required to load commands into the command queue 140 (FIG. 6), for subsequent execution by the auxiliary processor. Loading the command queue is the initial processing action of the message queue control process. The notification (action box 216, FIG. 7) that a transaction request entry has been loaded into the message queue is received by the operating system (action box 301). The operating system then schedules subsequent performance of the procedure for loading a command into the command queue, the initial processing procedure of the message queue control process (action box 303). Sometime later (as indicated by the dashed line leaving action box 303), the operating system causes that previously scheduled procedure to be executed. First, the initial processing procedure tests (test 305) whether the intermediate pointer IMQ equals the load pointer LMQ. When these pointers are equal (positive result of test 305), no transaction request entries are available for initial processing, and other work is resumed (action box 307). When these pointers are not equal (negative result of test 305), a test is made (test 309) to determine whether there is space for an entry in command queue 140 (FIG. 6). If there is no available space in command queue 140, the initial processing procedure requests the operating system to reschedule the initial processing procedure for subsequent execution (action box 311) and other work is resumed (action box 313).

When a transaction request entry is available for initial processing (negative result of test 305) and space is available in the command queue (positive result of test 309), the intermediate pointer IMQ is advanced by being set to IMQ(A) (action box 321), and initial processing (action box 323) is performed for the transaction request entry pointed to by the new value of IMQ. Following performance of initial processing of one entry, a program loop is reentered and test 305 (testing whether IMQ and LMQ are now equal) is repeated. The loop is repeated until IMQ and LMQ are equal (positive result of test 305) or until there is no more available space in the command queue (negative result of test 309), at which time other work is resumed (action box 307 or action box 311, respectively).

The actual process (action box 323) of loading a command into the command queue 140 (FIG. 6) will now be described. After the intermediate pointer IMQ is advanced, the message buffer (such as message buffer 125, FIG. 6) pointed to by the pointer stored at the location indicated by the now advanced intermediate pointer IMQ is accessed. The command data contained in that message buffer is processed and a command is generated. This command is then loaded into command queue 140, using the pointers in the command queue control block 141 (FIG. 6) as previously described with reference to FIG. 3 and 4.

The auxiliary processor 20 (FIG. 5) responds to the loading of a command in the command queue in the following manner. When the auxiliary processor prepares to execute a command in the command queue, it unloads that command thereby making space available for the loading of a new command. After the auxiliary processor has executed a command, it generates a response, indicating either successful execution of the command or one of a number of specific failure indications such as "Failure, Type A" or "Failure, Type B". The auxiliary processor loads this response into response queue 145 (FIG. 6), using the pointers in response queue control block 146 (FIG. 6). When the auxiliary processor has finished executing a command and has loaded a response into the response queue, the auxiliary processor transmits an interrupt signal over signal lead 24 (FIG. 5).

Figure 9:
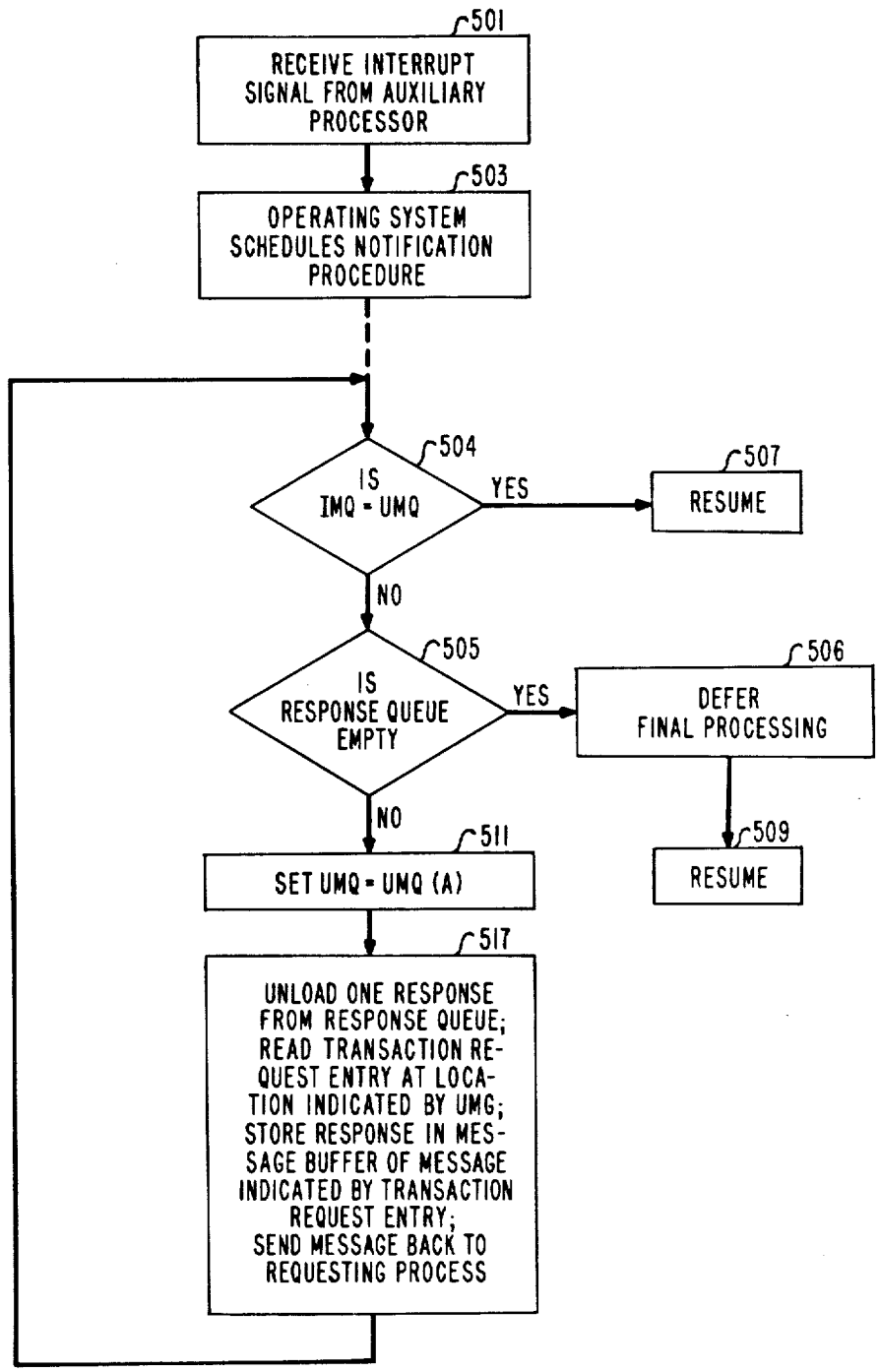
FIG. 9 is a flow diagram of the procedure for sending a response back to the program process which generated a transaction request, the final processing action of a transaction request entry.

FIG. 9 is a flow diagram of final processing actions required to complete the processing of a transaction request in the message queue. When the main processor receives an interrupt signal from the auxiliary processor (action box 501), the operating system of the main processor schedules the subsequent performance of the notification procedure (action box 503), which is the final processing procedure of the message queue control process. This procedure notifies the requesting process that a command has been executed and reports the response.

Subsequently (as indicated by the dashed line following action box 503), when the operating system schedule indicates that the notification procedure is to be executed, the operating system initiates the execution of that procedure. The notification procedure first tests whether the intermediate pointer IMQ and the unload pointer UMQ are equal (test 504). If they are equal (positive result of test 504), there are no transaction request entries for final processing in the message queue and other work is resumed (action box 507). If the pointers are not equal (negative result of test 504), a command for which a corresponding final processing action has not been performed has been loaded in command queue 140 (FIG. 6) and a response may have been loaded into response queue 145 (FIG. 6) by auxiliary processor 20 (FIG. 5). To check whether such a response has been loaded into response queue 145, the notification procedure tests whether the response queue 145 is empty (test 505). If the response queue is empty, the auxiliary processor has not yet finished executing a command, and final processing must be deferred (action box 506) to await an interrupt signal (action box 501).

Thereafter, other work is resumed (action box 509). If the response queue is not empty (negative result of test 505), final processing for at least one transaction request entry can now be performed, and the unload pointer UMQ is advanced (action box 511). Final processing is now performed (action box 517) for the transaction request entry pointed to by the new value of the unload pointer UMQ. Thereafter, a program loop is reentered by testing again whether the value of the unload pointer UMQ now equals the value of the intermediate pointer IMQ (test 504). Eventually, the two pointers will be equal (positive result of test 504) and other work is resumed (action box 507), or the response queue will be empty, and further final processing must be deferred (action box 506) and other work is resumed (action box 509).

Details of final processing for one transaction request entry (action box) 517) will now be described. First, the notification procedure unloads one response from the response queue. This makes space available in the response queue for the auxiliary processor 20 (FIG. 5) to report one more response. The unloaded response is loaded into a location such as location 130 (FIG. 6) of a message buffer pointed to by the transaction request entry which is pointed to by the unload pointer UMQ. The requesting process number stored in location 126 and the message queue control process number stored in location 127 are interchanged. The operating system is then requested to transmit the message stored in the message buffer to the newly specified destination process. Because the contents of locations 126 and 127 have been interchanged, that destination process is now the transaction requesting process. When the requesting process receives this message, it examines the response stored in location 130 in order to verify proper execution of the command or to take appropriate action based on a type of failure response.

Note that in this embodiment, a request for initial processing can be honored as soon as the main processor can be scheduled to perform the initial processing procedure. A request for final processing can only be honored after the auxiliary processor has generated a response to a command and has loaded this response into the response queue. While queue pointers indicate the presence or absence of initial or final processing requests in the queue, as this example demonstrates, other conditions, such as the completion of work by an auxiliary processor or some other peripheral controller, may further dictate whether a request can be honored at a particular time.

Figure 10:
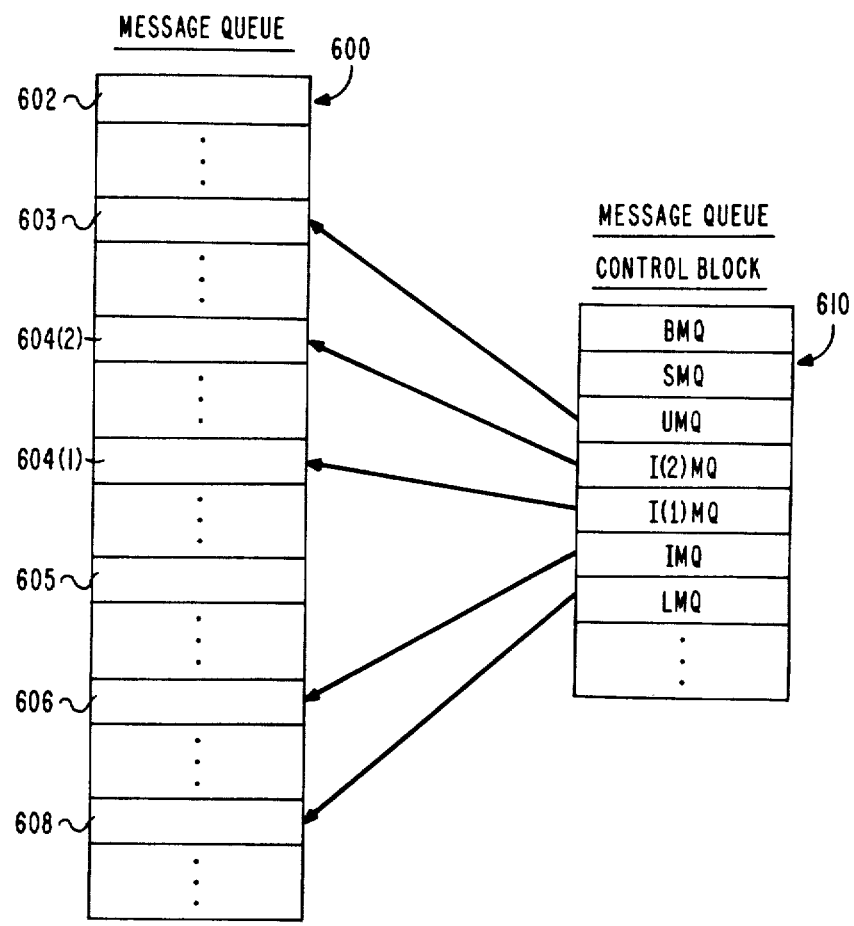
FIG. 10 shows an alternate message queue arranged to control execution of two additional, intermediate processing actions for each transaction request entry.

In certain situations, one or more stages of consecutively ordered intermediate processing actions may be required in addition to initial and final processing. The basic operations described for the preceding embodiment can be readily adapted to such requirements. FIG. 10 illustrates an arrangement comprising a message queue 600 and its associated message queue control block 610. This arrangement is equipped to handle transactions requiring four separate processing actions. Message queue control block 610 includes two additional intermediate pointers I(1)MQ and I(2)MQ in addition to the pointers shown in the message queue control block 110 of FIG. 6. These pointers point to intermediate locations 604(1) and 604(2) of message queue 600. This arrangement is used when two intermediate processing actions are carried out under control of the message queue 600 in addition to the initial and final processing actions. More generally, n+1 intermediate pointers are used if there are n intermediate processing actions between the initial and final processing actions.

When using the type of queue illustrated in FIG. 10, all intermediate processing actions are similar to the initial processing actions described herein with reference to FIG. 8. However, for each intermediate processing stage, the intermediate pointer corresponding to that stage is used to select the transaction request entry. Further, the value of the pointer for the previous intermediate processing stage is used in conjunction with the intermediate pointer for this stage to check for the presence of transaction request entries for which this stage of intermediate processing is to be performed. The loading, initial, and final processing actions are the same as the loading, initial and final processing actions described herein with reference to FIG. 7-9, except that in the final processing procedure (FIG. 9), the value of the last intermediate pointer I(n)MQ is substituted for the value of IMQ in the test for the presence of transaction request entries for which final processing is to be performed (test 504).

An advantage of the present invention is that the length of the single queue can be engineered from the combined queue requirements of all processing steps, instead of from the individual queue length requirement for each processing step. The length of a queue is a function of variations in the transaction request rate and the delay in processing transactions. Generally, a combined queue is shorter than the sum of the lengths of individual queues if the sources of delay in performing different processing actions are at least partially statistically independent. The statistical range of the sum of delays in processing is then less than the sums of the statistical ranges of delays in each process step. This permits a combined queue to be engineered whose length is less than the sum of the lengths of the alternative individual queues.

The prime purpose of the pointers is to indicate the next location where a transaction request entry may be loaded, or the location of the next transaction request entry to be processed. In the preceding description, pointers are advanced just before a transaction request entry is loaded or processed. The pointers thus normally point to the previously loaded or processed transaction request entry. An alternative equivalent procedure is to advance pointers just after an entry is loaded or processed, so that the pointers normally point to the next location to be loaded or request to be processed. Note, that since a pointer or other indicator to the previous transaction request entry can be readily derived from a pointer or other indicator to the next transaction request entry, a pointer or other indicator to the next entry is an indicator of the previous entry.

In this embodiment, simple pointers are used to point to entries in a queue. Clearly, more indirect indicators such as indexes, possibly used in conjunction with a base address, from which addresses can be calculated may be used alternatively. Further, in this embodiment, the transaction request entry in the message queue is a pointer to the message, and in the command queue, is the actual command. Other types of transaction request entries may be used alternatively. It is only necessary that the entry stored in a queue is adequate to locate or generate the data required for a particular stage of processing.

In this embodiment, an interrupt signal is used to communicate the presence of an entry in the response queue. Other methods, well known in the art, such as periodic checks, or messages between the two processors can also be used for this or equivalent purposes.

It is to be understood that the above-described embodiment is merely illustrative of the principles of this invention; other arrangements may be devised by those skilled in the art without departing from the spirit and scope of the invention.

What is claimed is:

1. In a data processing system comprising a queue for storing transaction request entries and load, intermediate and unload indicators for controlling operations on said queue, a method of initiating the performance of initial and final processing actions for each of said transaction request entries, comprising the steps of:
   loading each of said transaction request entries sequentially in said queue in a predetermined sequence in a location derived from said load indicator;
   performing said initial processing action for each of said transaction request entries, and retaining that transaction request entry in said queue, each entry to be processed being stored at a location derived from said intermediate indicator; and
   performing said final processing action for each of said transaction request entries in said predetermined sequence, said final processing action for a given one of said transaction request entries being performed after the performance of the initial processing action for that transaction request entry, each entry to be processed being stored at a location derived from said unload indicator.

2. The method of claim 1 wherein said step of performing said initial processing action for each of said transaction request entries is performed in said predetermined sequence.

3. The method of claim 1 further including the step of:
   removing each of said transaction request entries from said queue after said step of performing said final processing action is initiated.

4. In a data processing system for sequentially generating transaction requests, each of said transaction requests requesting performance of initial and final processing, a FIFO queue control arrangement comprising:
   a FIFO queue for storing transaction request entries, each of said transaction request entries corresponding to one of said transaction requests;
   a load indicator comprising data for deriving the location in said queue where the next of said transaction request entries is to be loaded;
   a first intermediate indicator comprising data for deriving the location in said queue of the next one of said transaction request entries for which initial processing is to be performed;
   an unload indicator comprising data for deriving the location in said queue of the next one of said transaction request entries for which final processing is to be performed; and
   processor means responsive to said load indicator for controlling loading into said queue of each of said transaction request entries sequentially in a predetermined sequence, responsive to said first intermediate indicator for initially processing each of said transaction request entries sequentially in said predetermined sequence, responsive to said unload indicator for finally processing each of said transaction request entries sequentially in said predetermined sequence, and responsive to said first intermediate indicator and said unload indicator for performing initial processing before final processing for each of said transaction request entries.

5. The queue control arrangement of claim 4 in which said processor means is further responsive to said load indicator to advance said load indicator for each action of loading one of said transaction request entries, to said first intermediate indicator to advance said first intermediate indicator for each initial processing action performed for one of said transction request entries, and to said unload indicator to advance said unload indicator for each final processing action performed for one of said transaction request entries.

6. The queue control arrangement of claim 5 wherein said queue is circular, further comprising additional indicators for deriving the locations of the beginning and end of said queue, and wherein said processor means is responsive to said unload indicator and said additional indicators for deriving the location in said queue beyond which none of said transaction request entries may be loaded.

7. The queue control arrangement of claim 4 wherein each of said transaction request entries further requests the performance of intermediate processing, intermediate processing of a given transaction request entry to follow initial processing and to precede final processing for each of said transaction request entries, further comprising:
   a second intermediate indicator for indicating the location in said queue of the next one of said transaction request entries for which intermediate processing is to be performed; and
   wherein said processor means further performs intermediate processing for each of said transaction request entries in said predetermined sequence, and is further responsive to said first and said second intermediate indicator and to said unload indicator to perform intermediate processing after initial processing and before final processing for each of said transaction request entries.

8. In a data processing system comprising a queue for storing transaction request entries, each of said transaction request entries requesting performance of initial processing and final processing, a method of scheduling the processing of said transaction request entries under the control of queue control processes, comprising the steps of:
   loading said transaction request entries sequentially in a predetermined sequence in said queue;
   selecting from said queue a first one of said transaction request entries, performing initial processing for said first one of said transaction request entries, and retaining said first one of said transaction request entries in said queue after performing said initial processing;
   selecting from said queue a second one of said transaction request entries, and performing final processing for said second one of said transaction request entries and removing said second one of said transaction request entries from said queue, wherein said second one of said transaction request entries was loaded in said queue before said first one of said transaction request entries;
   performing final processing for said first one of said transaction request entries after the performance of final processing for said second one of said transaction request entries; and
   removing said first one of said transaction request entries from said queue.

9. The method of claim 8 further comprising the steps of:
   selecting from said queue a third one of said transaction request entries, performing initial processing for said third one of said transaction request entries, and retaining said third one of said transaction request entries in said queue, said third one of said transaction request entries having been loaded in said queue after said first one of said transaction request entries, the step of performing initial processing for said third one of said transaction request entries being performed after the step of performing initial processing for said first one of said transaction request entries; and
   performing final processing for said third one of said transaction request entries after the performance of final processing for said first one of said transaction request entries and removing said third one of said transaction request entries from said queue.

10. In a data processing system comprising a queue for storing transaction request entries and load, intermediate and unload indicators, a method of initiating the processing for said transaction request entries comprising the steps of:
   loading one of said transaction request entries at a first location in said queue derived from said load indicator;
   advancing said load indicator;
   performing initial processing for the transaction request entry stored in a second location in said queue derived from said intermediate indicator;
   advancing said intermediate indicator;
   performing final processing for the transaction request entry stored in a third location in said queue derived from said unload indicator; and
   advancing said unload indicator.

11. In a data processing system comprising storage, a FIFO queue control arrangement comprising:
   a FIFO queue in said storage for storing transaction request entries;
   a load indicator for indicating the location in said queue where the next of said transaction request entries is to be loaded;
   an intermediate indicator for indicating the location in said queue of the next of said transaction request entries for which initial processing is to be performed;
   an unload indicator for indicating the location in said queue of the next of said transaction request entries for which final processing is to be performed; and
   processor means responsive to said load indicator for loading each of said transaction request entries in a location in said queue derived from said load indicator, responsive to said intermediate indicator for performing initial processing for one of said transaction request entries stored at a location in said queue derived from said intermediate indicator, and responsive to said unload indicator for performing final processing for one of said transaction request entries stored at a location in said queue derived from said unload indicator.

* * * * *